(12) United States Patent  (10) Patent No.: US 8,568,937 B2
Formanski et al.  (45) Date of Patent: Oct. 29, 2013

(54) FUEL CELL DESIGN WITH AN INTEGRATED HEAT EXCHANGER AND GAS HUMIDIFICATION UNIT

(75) Inventors: Volker Formanski, Wiesbaden (DE); Peter Kilian, Heidelberg (DE); Thomas Herbig, Darmstadt (DE); Marc Becker, Idstein (DE); Peter Willimowski, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 12/855,795

(22) Filed: Aug. 13, 2010

(65) Prior Publication Data

US 2010/0304261 A1  Dec. 2, 2010

Related U.S. Application Data

(62) Division of application No. 11/112,102, filed on Apr. 22, 2005, now Pat. No. 7,829,231.

(51) Int. Cl.
 *H01M 8/04* (2006.01)
(52) U.S. Cl.
 USPC .......................................... 429/434; 429/514
(58) Field of Classification Search
 USPC ........................................ 429/512–514, 434
 See application file for complete search history.

(56) References Cited

U.S. PATENT DOCUMENTS

| 5,981,098 | A | 11/1999 | Vitale |
| 6,045,934 | A * | 4/2000 | Enami ........................... 429/439 |
| 6,099,984 | A | 8/2000 | Rock |
| RE37,284 | E | 7/2001 | Li et al. |
| 6,309,733 | B1 | 10/2001 | Minaai et al. |
| 6,358,642 | B1 | 3/2002 | Griffith et al. |
| 6,503,653 | B2 | 1/2003 | Rock |
| 6,699,614 | B2 | 3/2004 | Rock |
| 2003/0039875 | A1 * | 2/2003 | Horiguchi et al. .............. 429/26 |
| 2003/0224239 | A1 * | 12/2003 | Carlstrom ....................... 429/38 |
| 2004/0081873 | A1 * | 4/2004 | Iwai et al. ....................... 429/26 |
| 2004/0157098 | A1 | 8/2004 | Wexel et al. |
| 2005/0058864 | A1 * | 3/2005 | Goebel ............................ 429/26 |
| 2005/0084731 | A1 | 4/2005 | Nishimura et al. |
| 2005/0118490 | A1 * | 6/2005 | Sano et al. ....................... 429/38 |
| 2005/0244700 | A1 | 11/2005 | Abd Elhamid et al. |
| 2005/0275120 | A1 | 12/2005 | Sasamoto |

FOREIGN PATENT DOCUMENTS

WO  2004004048 A1  1/2004

* cited by examiner

*Primary Examiner* — Patrick Ryan
*Assistant Examiner* — Muhammad Siddiquee
(74) *Attorney, Agent, or Firm* — Quinn Law Group, PLLC (57) ABSTRACT

A fuel cell assembly having a flow distribution subassembly that comprises four sets of flow channels, the first set facing an anode for distribution of a fuel reactant to said anode, the second set facing a cathode for distribution of an oxidant to said cathode, the third set in flow communication with said second set and in heat transfer relation with at least one of said anode and said cathode, and the fourth set receiving a coolant different from said oxidant.

4 Claims, 7 Drawing Sheets

FUEL CELL DESIGN WITH AN INTEGRATED HEAT EXCHANGER AND GAS HUMIDIFICATION UNIT

CROSS-REFERENCE TO RELATED APPLICATIONS

This application is a divisional of U.S. patent application Ser. No. 11/112,102 filed on Apr. 25, 2004. The entire disclosures of the above application is incorporated herein by reference.

FIELD OF THE INVENTION

The present invention relates to the humidification and cooling of a fuel cell power system, and, in particular, to an apparatus and method for the integrated humidification and cooling of a fuel cell.

BACKGROUND OF THE INVENTION

Fuel cell power systems convert a fuel and an oxidant into electricity. One such fuel cell power system has a proton exchange membrane (hereinafter also referred to as "PEM") to catalytically facilitate the reaction of fuels (such as hydrogen) and oxidants (such as oxygen or air) into electricity. The PEM is a solid polymer electrolyte that facilitates transfer of protons from the anode to the cathode in each individual fuel cell of the stack of fuel cells present in a fuel cell power system.

In a typical fuel cell assembly, or stack, each fuel cell has flow fields in flow communication with manifolds that provide channels for the various reactant gases to flow into each cell. Gas diffusion assemblies then distribute the reactants from the flow fields to the reactive anode and cathode of a membrane electrode assembly (hereinafter also referred to "MEA").

Effective operation of a PEM fuel cell requires proper humidification of the PEM to maintain its proton conductivity. At the same time, the flow field channels and gas diffusion assemblies must be maintained in non-flooded operational states. In operation, the oxidant is supplied to the cathode where it reacts with hydrogen cations that have crossed the PEM and electrons from an external circuit. The fuel cell generates both electricity and water through the electrochemical reaction. The water is typically removed with the cathode effluent, which may dehydrate the PEM unless the water is otherwise replaced. It should be noted that the rate of evaporation to the cathode is generally greater than the rate of water generation.

When hydrated, the polymeric PEM possesses "acidic" properties that provide a medium for conducting protons from the anode to the cathode of the fuel cell. However, if the PEM is not sufficiently hydrated, the "acidic" character diminishes, and may impede the desired electrochemical reaction of the cell. Hydration of the PEM also assists in temperature control within the fuel cell, insofar as the heat capacity of water provides a heat sink. In addition to issues of water balance and cell hydration, another issue in fuel cell design is the efficient use of space. For example, space in a vehicle is precious and designs that minimize the ongoing use of space in the vehicle clearly benefit the utility of the vehicle; this leads toward integration of the humidifying system into each of the fuel cells.

The need for efficiency in operation and greater integration of cooling and humidification to achieve efficient space utilization in fuel cell systems continues to be strongly felt. What is needed is a fuel cell power system which provides integrated humidification of the feed gases (especially the oxidant) and cooling of the MEA.

SUMMARY OF THE INVENTION

The present invention is directed to a fuel cell having a membrane electrode assembly in reactive interface with (1) a plurality of oxidant reactant flow channels receiving and carrying an oxidant reactant, and (2) a plurality of fuel reactant flow channels receiving and carrying a fuel reactant. The fuel cell includes a plurality of oxidant coolant channels, each in thermal interface with an MEA, preferably for the length of the reactive interface. Preferably each oxidant coolant channel is also in flow communication with a respective cathode reactant flow channel. Two-phase air feed, which may include nebulized water and air, is provided to each oxidant coolant channel. The nebulized water humidifies the air using heat from the fuel cell. Humidified air is discharged from the oxidant coolant channel outlet to provide humidified oxidant to the cathode reactant channel.

In a further aspect, the present invention provides a plurality of coolant flow channels adjacent to the reactant flow channels and the MEA. The coolant flow channels are positioned providing a thermal interface surface adjacent the MEA. Preferably, each coolant flow channel has an elongated axis in parallel alignment with the elongated axis of the adjacent reactant flow channel for the length of the reactive interface of the fuel cell. In one embodiment, the plurality of coolant flow channels transports a dielectric liquid coolant.

In another variation, the oxidant coolant and the liquid dielectric coolant are used together in separate coolant channels.

In yet another aspect of the present invention, an oxidant cooling channel cools the fuel cell while receiving water from the liquid coolant channel via a water transport media. The water humidifies the oxidant prior to entering the cathode reactant channel.

In still another aspect of the present invention, the fuel cell system includes a fuel processor making a reformate gas for the fuel cell from a hydrocarbon fuel feed, a reformer water feed, and a reformer air feed. The fuel processor and fuel cell are controlled by a computer which balances water flows to hydrate the fuel cell.

A further aspect of the present invention discloses a method for cooling an electrochemical fuel cell. The method includes conducting an electrochemical reaction by oxidizing a fuel reactant with an oxidant reactant at an MEA. In addition to water, the reaction produces electricity and thermal energy. The MEA is cooled by transferring heat to at least one of the reactants in a first flow path, thereby heating the reactant. The heated reactant is subsequently directed to a second flow path leading to the MEA in a reactant capacity.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
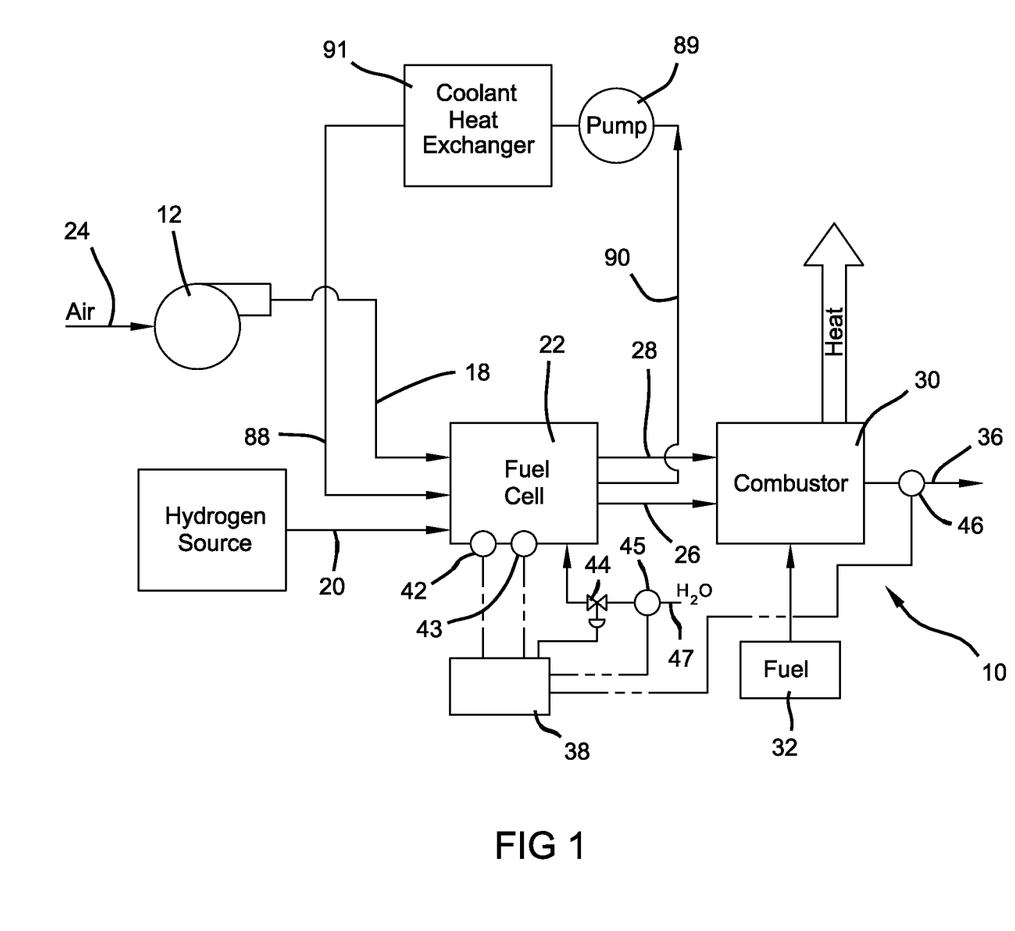
FIG. 1 illustrates a fuel cell power system with water management instrumentation and control.

As shown in FIG. 1, a fuel cell power system 10 includes a fuel cell stack 22. Hydrogen or hydrogen-containing reformate from a hydrogen source 20 which feeds hydrogen through the anode chamber of the fuel cell stack 22. At the same time, oxygen in the form of air in oxidant stream 24 is fed from a compressor, or a blower 12, into the cathode chamber of fuel cell stack system 22 through passage 18. The hydrogen from hydrogen stream 20 and the oxygen from oxidant stream 24 react in fuel cell stack 22 to produce electricity. The hydrogen or hydrogen-containing reformate can be supplied from a hydrogen storage vessel or produced by a fuel processor, as is known in the art.

Anode exhaust (or effluent) 26 from the anode side of fuel cell stack 22 contains some unreacted hydrogen. Cathode exhaust (or effluent) 28 from the cathode side of fuel cell stack system 22 may contain some unreacted oxygen. These unreacted gases represent additional energy that can optionally be recovered in combustor 30, in the form of thermal energy, for various heat requirements within power system 10.

Specifically, a hydrocarbon fuel 32 and/or anode effluent 26 are combusted, catalytically or thermally, in combustor 30 with oxygen either from air in stream 34 or from cathode effluent stream 28, depending on power system 10 operating conditions. Combustor 30 discharges exhaust stream 36 to the environment, and the heat generated thereby may be directed to a fuel processor or other system components as needed.

Coolant is supplied to the fuel cell stack 22 at inlet 88 and exits through passage 90. A pump 89 and heat exchanger 91 are provided for providing continuous flow of coolant through the fuel cell stack.

Figure 2:
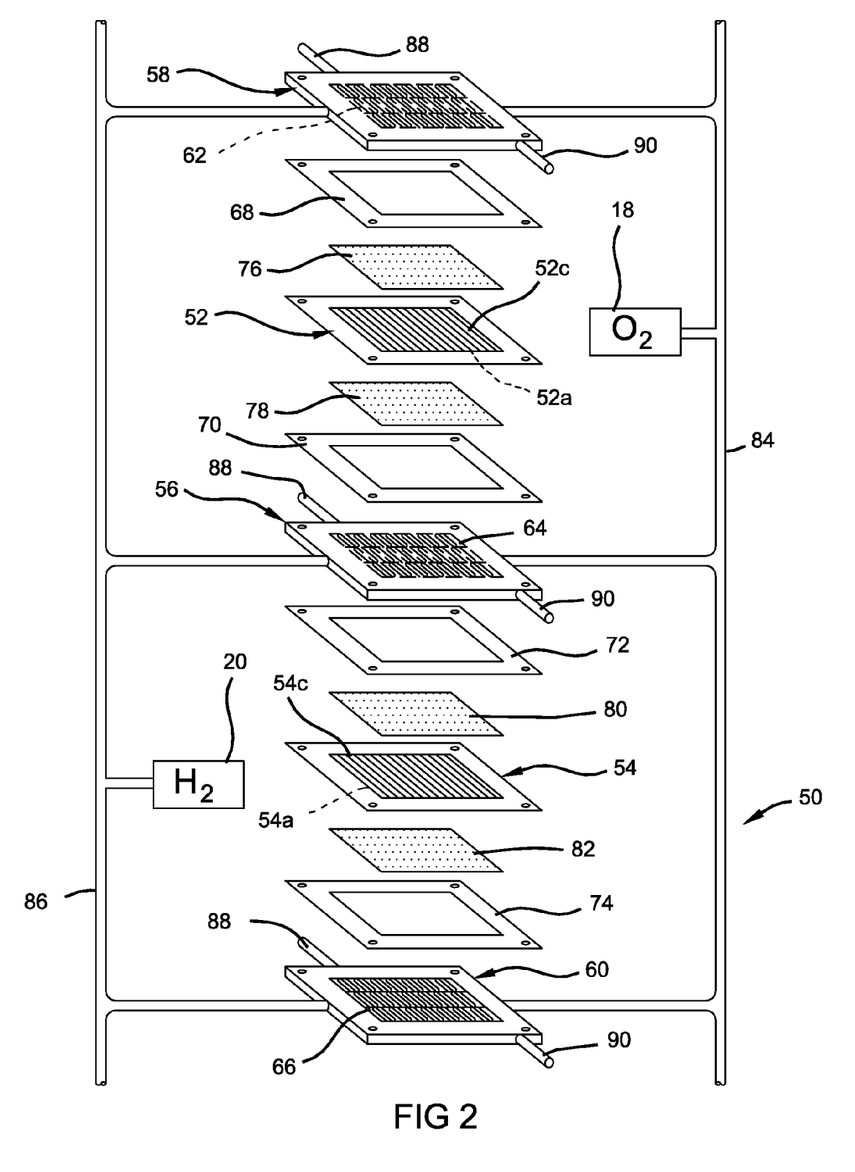
FIG. 2 is a schematic, exploded, isometric illustration of an exemplary liquid-cooled PEM fuel cell stack (only two cells shown)

As shown in FIG. 2, a partial PEM fuel cell stack 50 is depicted having a pair of membrane electrode assemblies (MEAS) 52, 54 separated from each other by a non-porous, electrically-conductive bipolar plate 56. Each MEA 52, 54 has a cathode face 52c, 54c and an anode face 52a, 54a. The MEAs 52, 54 and bipolar plate 56 are stacked together between non-porous, electrically-conductive, liquid-cooled end plates 58, 60. Each plate 56, 58, 60 includes a respective flow field 62, 64, 66 established from a plurality of flow channels formed in the faces of the plates for the distribution of fuel and oxidant gases to the reactive faces of the MEAs 52, 54. Nonconductive gaskets or seals 68, 70, 72, 74 provide sealing and electrical insulation between the several plates of fuel cell stack 50.

Porous, gas-permeable, electrically conductive sheets 76, 78, 80, 82 press up against the electrode faces of MEAs 52, 54 and serve as primary current collectors for the respective electrodes. The electrically conductive sheets 76, 78, 80, 82 additionally provide mechanical support for the respective MEAs. Bipolar plate 58 presses up against primary current collector 76 on the cathode face 52c of the MEA 52; likewise, bipolar plate 60 presses up against the primary current collector 82 on the anode face 54a of the MEA 54, and bipolar plate 56 presses up against primary current collector 78 on the anode face 52a of one MEA 52, and against the primary current collector 80 on the cathode face 54c of another MEA 54.

An oxidant 18 is supplied to the cathode side of the fuel cell stack 50 from an appropriate supply plumbing 84. Similarly, hydrogen 20 is supplied to the anode side of the fuel cell 50 from an appropriate supply plumbing 86. Exhaust plumbing (not shown) is also provided for removing anode effluent from the anode flow fields and the cathode effluent from the cathode flow fields. Coolant plumbing 88, 90 is provided for supplying and exhausting liquid coolant to the bipolar plates 56, 58, 60, as needed.

It should be noted that, for simplicity, the fuel cell stack 50 shows two fuel cells with plate 56 being shared between the two fuel cells and plates 58, 60 being shared between one of the shown fuel cells. In this regard, a "fuel cell" within a fuel cell stack is not physically fully separable insofar as any particular fuel cell in the stack will share at least one side of a bipolar plate with another cell.

Figure 3:
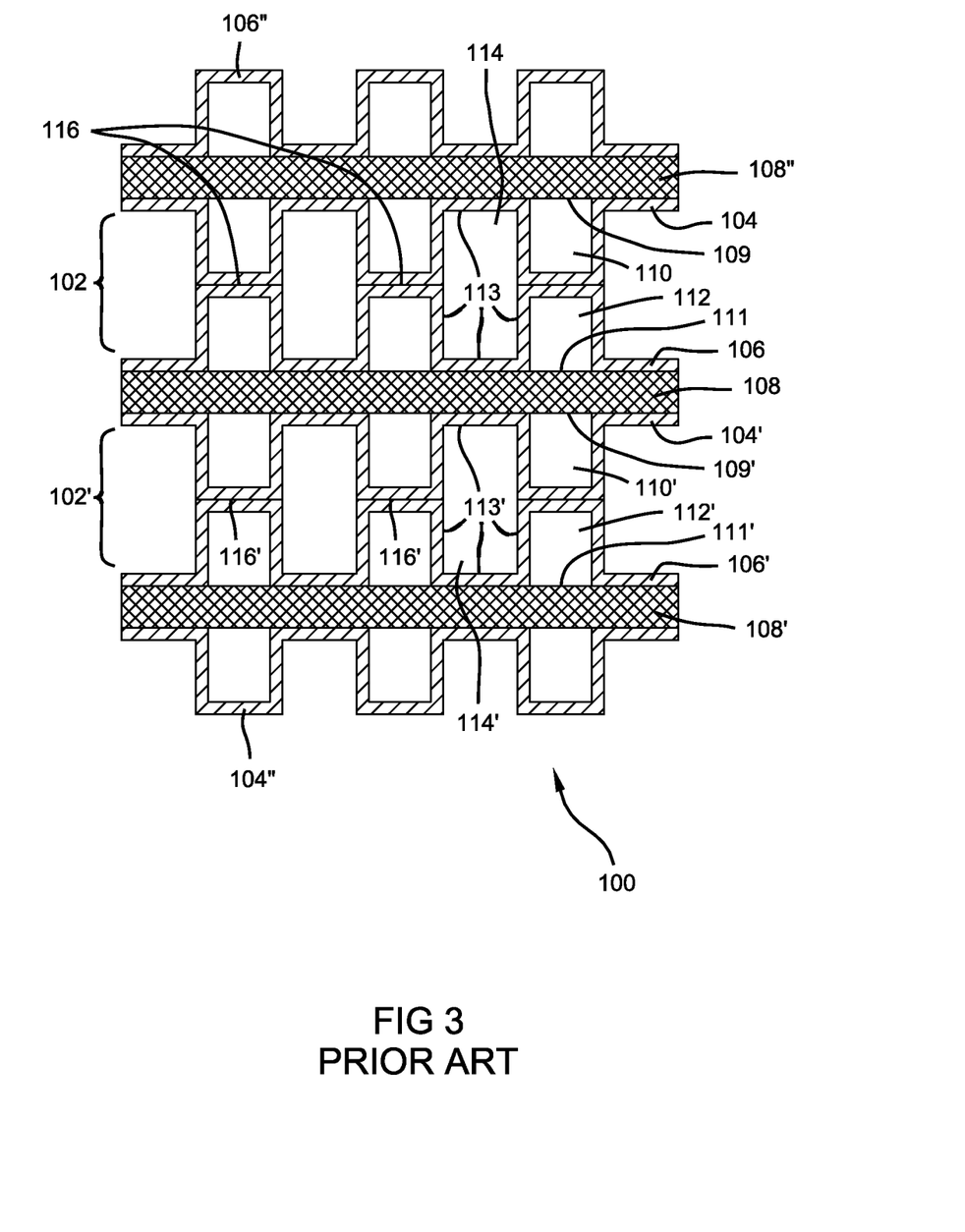
FIG. 3 is an exploded, partial cross-sectional view of a prior art PEM fuel cell assembly.

FIG. 3 is an exploded, partial cross-sectional view, illustrating a prior art PEM fuel cell stack 100. The fuel cell stack 100 includes a bipolar plate 102 consisting of an anode distribution plate 104 and a cathode distribution plate 106. The distribution plates 104, 106 are patterned with a plurality of alternating lands and grooves defining various sets of flow channels, each having respective anode-confronting and cathode-confronting faces. The anode distribution plate 104 defines a first set of flow channels, or anode reactant channels 110, in reactive interface with the anode face 109 of MEA 108. The cathode distribution plate 106, defines a second set of flow channels, or cathode reactant channels 112, in reactive interface with the cathode face 111 of MEA 108. The anode and cathode distribution plates 104, 106 are joined and electrically coupled together at a plurality of lands, or interfaces 116, using conventional methods such as brazing, welding or adhesive bonding. In this regard, the respective anode and cathode reactant channels 110, 112 are axially aligned and directly oppose one another. A first set of coolant channels 114 is defined by the back sides, or heat exchange faces 113, of the gas distribution plates 104, 106. The flow channels 110, 112, 114 are preferably arranged in the anode and cathode distribution plates 104, 106 such that the first set of coolant channels 114 extends the entire height of the bipolar plate 102 and is located adjacent the anode and cathode channels 110, 112 which extend approximately one-half the height of the bipolar plate 102. The coolant channels 114 have thermal interfaces with two MEAs 108, 108'.

The fuel cell stack 100 also includes a second bipolar plate 102" consisting of an anode distribution plate 104' and a cathode distribution plate 106' joined together. The anode distribution plate 104' defines a similar set of anode reactant channels 110' in reactive interface with the anode face 109' of MEA 108. Likewise, the cathode distribution plate 106' defines a similar set of cathode reactant channels 112' in reactive interface with the cathode face 111' of MEA 108'. The anode and cathode distribution plates 104', 106' are joined and electrically coupled together at a plurality of lands, or interfaces 116', using conventional methods such as brazing, welding or adhesive bonding. Similar to bipolar plate 102, the distribution plates 102', 104' are axially aligned and the reactant channels 110', 112' directly oppose one another. A second set of coolant channels 114' is defined by the back sides, or heat exchange faces 113', of the distribution plates 104', 106'. The flow channels 110', 112', 118 are preferably arranged in the anode and cathode distribution plates 104', 106' such that the second set of coolant channels 114' extends the entire height of the bipolar plate 102' and is located adjacent the anode and cathode channels 110', 112' which extend approximately one-half the height of the bipolar plate 102'. The second set of coolant channels 114' have thermal interfaces with two MEAs 108, 108'. For completeness, anode plate 104' and cathode plate 106' are also shown.

The present invention involves providing a fourth flow field to the stack design for providing integrated humidification and cooling of a fuel cell. Insofar as the preferred embodiments of FIGS. 4-6 share many similar aspects and considerations with those of FIG. 3, considerations discussed in FIG. 3 respective to channel layout, materials, fluids, and thermodynamics are equally applicable to the embodiments illustrated in FIGS. 4-6 in view of the foregoing discussion. Accordingly, only those features of differentiating interest in FIGS. 4-6 will be discussed hereinafter.

Figure 4:
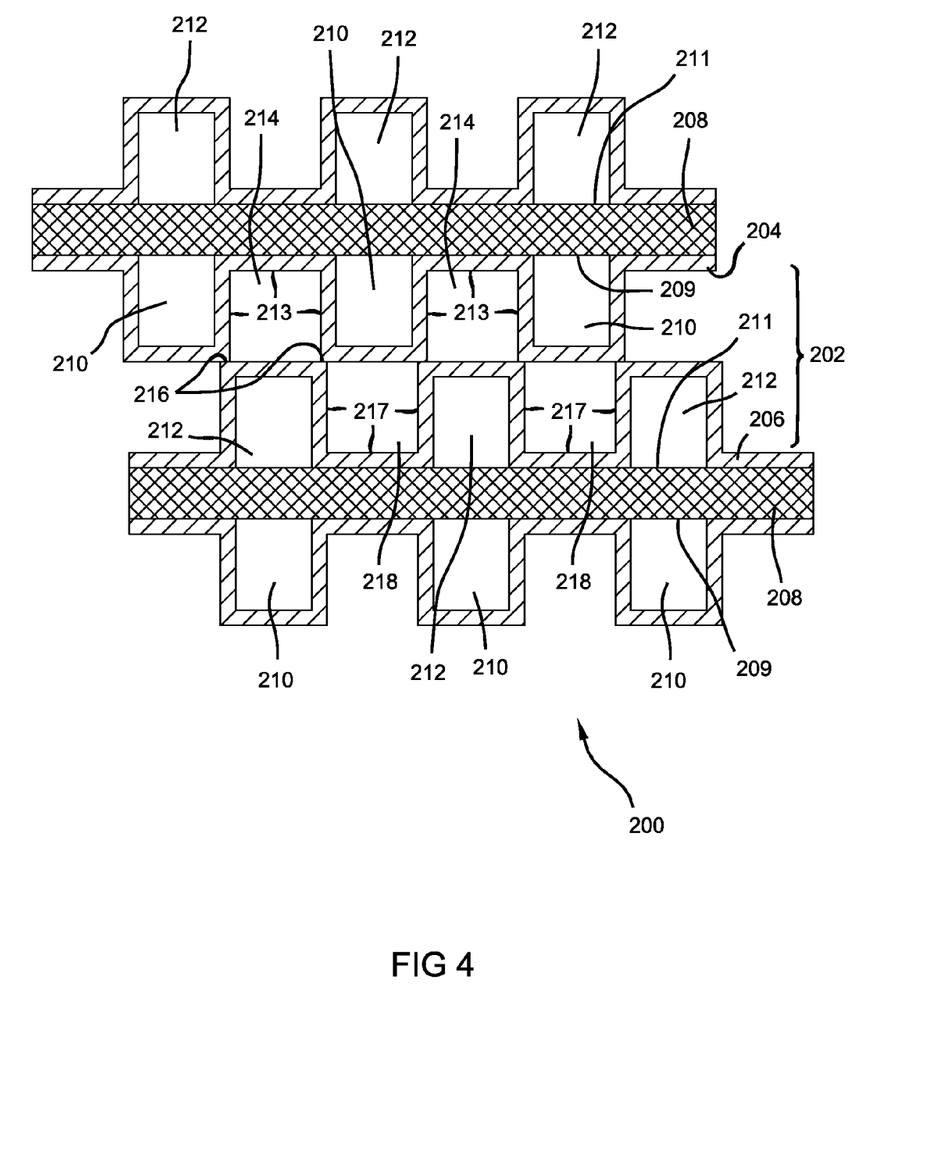
FIG. 4 is an exploded, partial cross-sectional view of a PEM fuel cell assembly according to a first preferred embodiment of the present invention.

FIG. 4 illustrates a partial cross-sectional view of a PEM fuel cell stack 200 according to a first preferred embodiment of the present invention. The fuel cell stack 200 includes a bipolar plate 202 consisting of an anode distribution plate 204 and a cathode distribution plate 206. The anode distribution plate 204 defines a set of anode reactant channels 210 in reactive interface with the anode face 209 of MEA 208. The cathode distribution plate 206 defines a set of cathode reactant channels 212 in reactive interface with the cathode face 211 of MEA 208. The anode and cathode distribution plates 204, 206 are joined and electrically coupled together at a plurality of interfaces 216 using conventional methods such as brazing, welding or adhesive bonding. In this regard, the respective anode reactant channels 210 and cathode reactant channels 212 are offset from one another and are surrounded by a coolant on three sides. A first set of coolant channels 214 is defined by the back sides, or anode heat exchange faces 213, of the anode distribution plate 204. A second set of coolant channels 218 is defined by the back sides, or cathode heat exchange faces 217, of the cathode distribution plate 206.

The flow channels 210, 212, 214, 218 are arranged in the anode and cathode distribution plates 204, 206 such that the first coolant channel 214 extends approximately one-half the height of the bipolar plate 202 and is directly opposed the cathode reactant channel 212 which also extends approximately one-half the height of bipolar plate 202. The second coolant channel 218 extends approximately one-half the height of bipolar plate 202 and is directly opposed the anode reactant channel 210 which also extends approximately one-half the height of bipolar plate 202.

The cross-sectional areas of the plurality of flow channels 210, 212, 214, 218 are determined by the shape or pattern of the respective distribution plates 204, 206. The distribution plates 204, 206 can be designed to have the specific cross-sectional area corresponding to a desired volumetric flow rate. In this regard, while FIG. 4 depicts the reactant channels 210, 212 and the cooling channels 214, 218 having similar respective cross-sectional areas, each can be designed having a different cross-sectional area.

In various embodiments, oxidant, or compressed air, is provided to the second set of coolant channels 218 wherein heat is extracted from the fuel cell stack 200 and used to heat the oxidant which is subsequently directed to the cathode reactant channels 212 as the cathode reactant. In this manner, the second set of coolant channels is used to heat the air prior to entering the cathode reactant flow channels. Alternatively, in various other embodiments, the compressed air may need to be cooled prior to its entry in the flow channels. The determination of whether the air needs to be heated or cooled depends, in part, on the source of the air supply (a compressor or a blower) and the discharge pressure. In either embodiment, the air should be adjusted (by heating or cooling) to the stack temperature prior to entering the cathode flow field. Hydrogen is provided to the anode reactant channels 210 as the anode reactant. A dielectric liquid coolant, such as water, is provided to channels 214 as a coolant to further extract heat from the fuel cell stack 200.

In accordance with the present invention, the oxidant coolant channels 218 are in flow communication with the cathode reactant channels 212. In one embodiment, the fluid interface is direct, such that an outlet of coolant channel 218 is essentially a continuous passage leading to an inlet of cathode reactant channels 212. In an alternate embodiment, a group of outputs from the coolant channels 218 fluidly interface with a manifold (not shown) which also fluidly interfaces with a group of inlets from the reactant channels 212. A forwarding pump (not shown) may be utilized as a part of the fluid communication interface. In a preferred operation, a two-phase feed stream consisting of nebulized water (atomized water, water mist, water particles, fog) and air is provided to the second set of coolant channels 218. The nebulized water proceeds through the oxidant coolant channels 218 and humidifies the air using heat from the electrochemical reactions as the latent heat of vaporization to fully vaporize the nebulized water. The humidification process thus provides a degree of heat extraction, thereby further cooling the fuel cell stack 200. The humidified air is discharged therefrom providing a humidified oxidant reactant to the cathode reactant channels 212.

Water is preferably added to the oxidant coolant channels 218 by nebulizing the water so that it is essentially entrained in air, providing a two-phase fluid of air and nebulized water. Water may be nebulized using spray nozzles, sonic misters, vaporizers or other means to adequately disperse water into the air stream.

As used herein, "water" means water that, in a compositional nature, is useful for operation of a fuel cell power system. While certain particulates are acceptable in generally available water, they might cause plugging in addition to plugging caused by particulates in the oxidant gas; therefore, as should be apparent, the water used must be appropriately filtered before being introduced into the fuel cell.

Figure 5A:
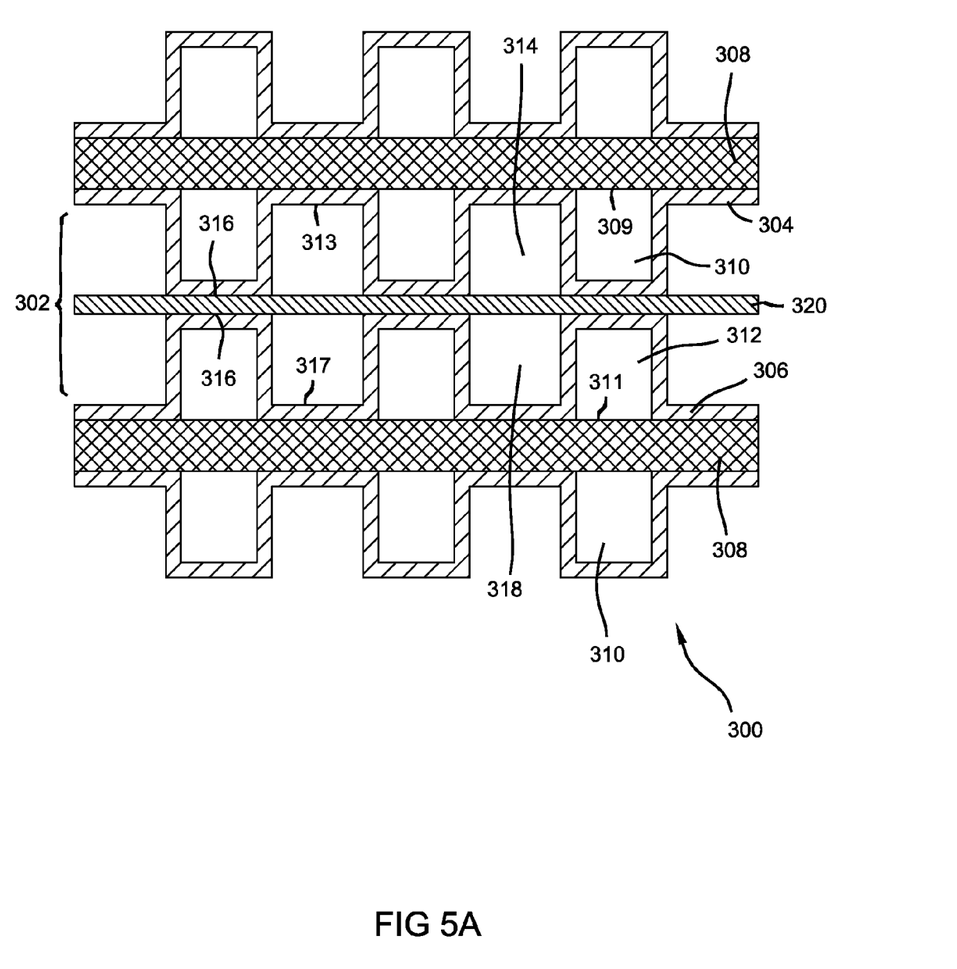
FIGS. 5A and 5B are exploded, partial cross-sectional views of a PEM fuel cell assembly according to a second preferred embodiment of the present invention.

FIG. 5A illustrates a PEM fuel cell stack 300 according to a second preferred embodiment of the present invention. The fuel cell stack 300 includes a bipolar plate 302 consisting of an anode distribution plate 304 and a cathode distribution plate 306. A set of anode reactant channels 310 formed in the anode distribution plate 304 is in reactive interface with the anode face 309 of MEA 308. A set of cathode reactant channels 312 formed in the cathode distribution plate 306 is in reactive interface with the cathode face 311 of MEA 308. A separation layer, or separator plate 320, is interposed between the anode distribution plate 304 and the cathode distribution plate 306. The separator plate 320 and anode heat exchange faces 313 of the anode distribution plate 304 define a first set of coolant channels 314. Likewise, the separator plate 320 and cathode heat exchange faces 317 of the cathode distribution plate 306 defines a second set of coolant channels 318. The separation layer 320 is preferably a non-porous electrically conductive material, and provides heat transfer control between the coolant channels 314, 318.

The anode distribution plate 304 is patterned and arranged such that the first set of coolant channels 314 extend approximately one-half the height of the bipolar plate 302 and alternates with the set of anode channels 310. The cathode distribution plate 306 is patterned and arranged such that the second set of coolant channels 318 extends approximately one-half the height of the bipolar plate 302 and alternates with the set of cathode channels 312. The anode and cathode distribution plates 304, 306 and the separation layer 320 are joined and electrically coupled together at a plurality of interfaces 316 using conventional methods such as brazing, welding or adhesive bonding.

As presently preferred, oxidant is provided to the second set of coolant channels 318 wherein heat is extracted from the fuel cell stack 300 and used to heat the oxidant which is subsequently directed to the cathode reactant channels 312 as the cathode reactant. Hydrogen is provided to the anode reactant channels 310 as the anode reactant. A dielectric liquid coolant such as water is provided to the first set of coolant channels 314 further extracting heat from the fuel cell stack 300.

Figure 5B:
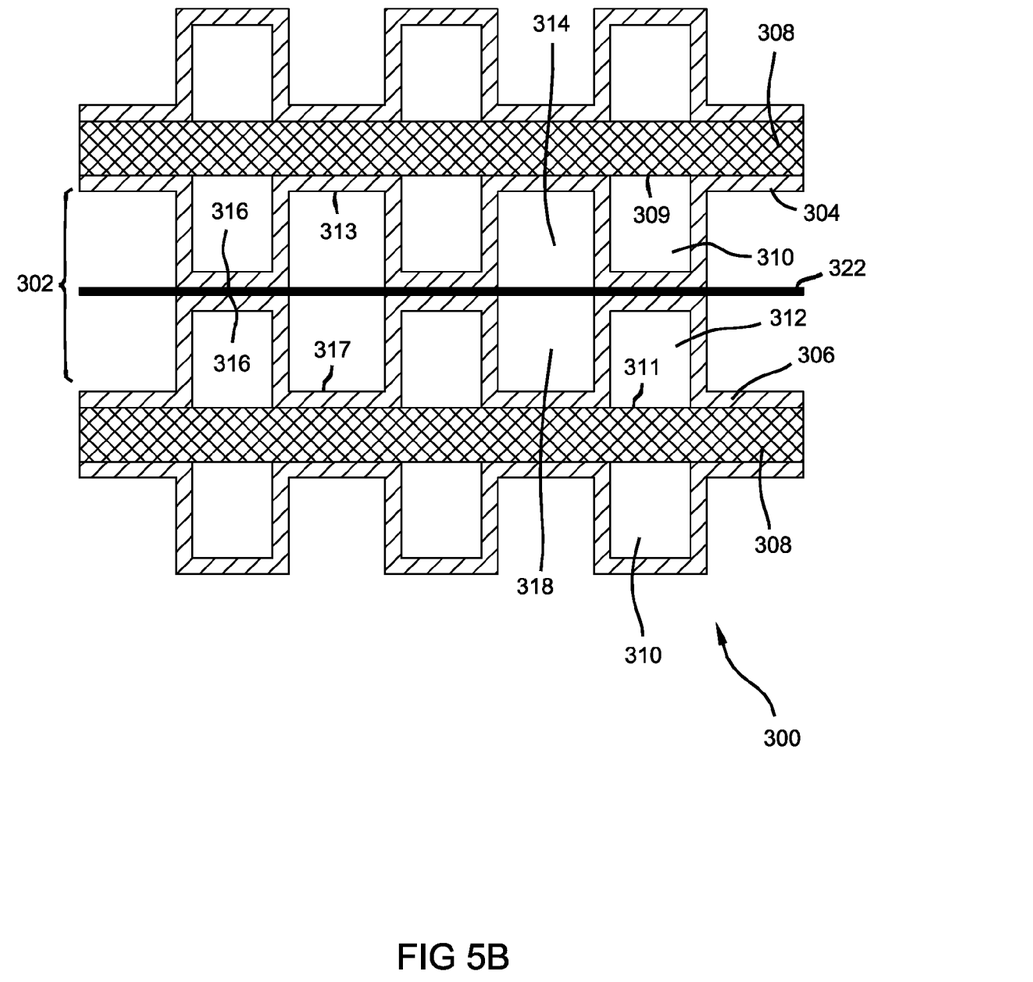

FIG. 5B illustrates an alternate design of the second preferred embodiment having a water transport media, or water permeable membrane 322, separating the distribution plates 304, 306. Preferably, the coolant in the first set of coolant channels 314 contains liquid water. The water travels through the first set of coolant channels 314 thereby cooling the MEA. It also permeates through the water transport media and humidifies the oxidant coolant flowing in the adjacent coolant channels 318.

Figure 6:
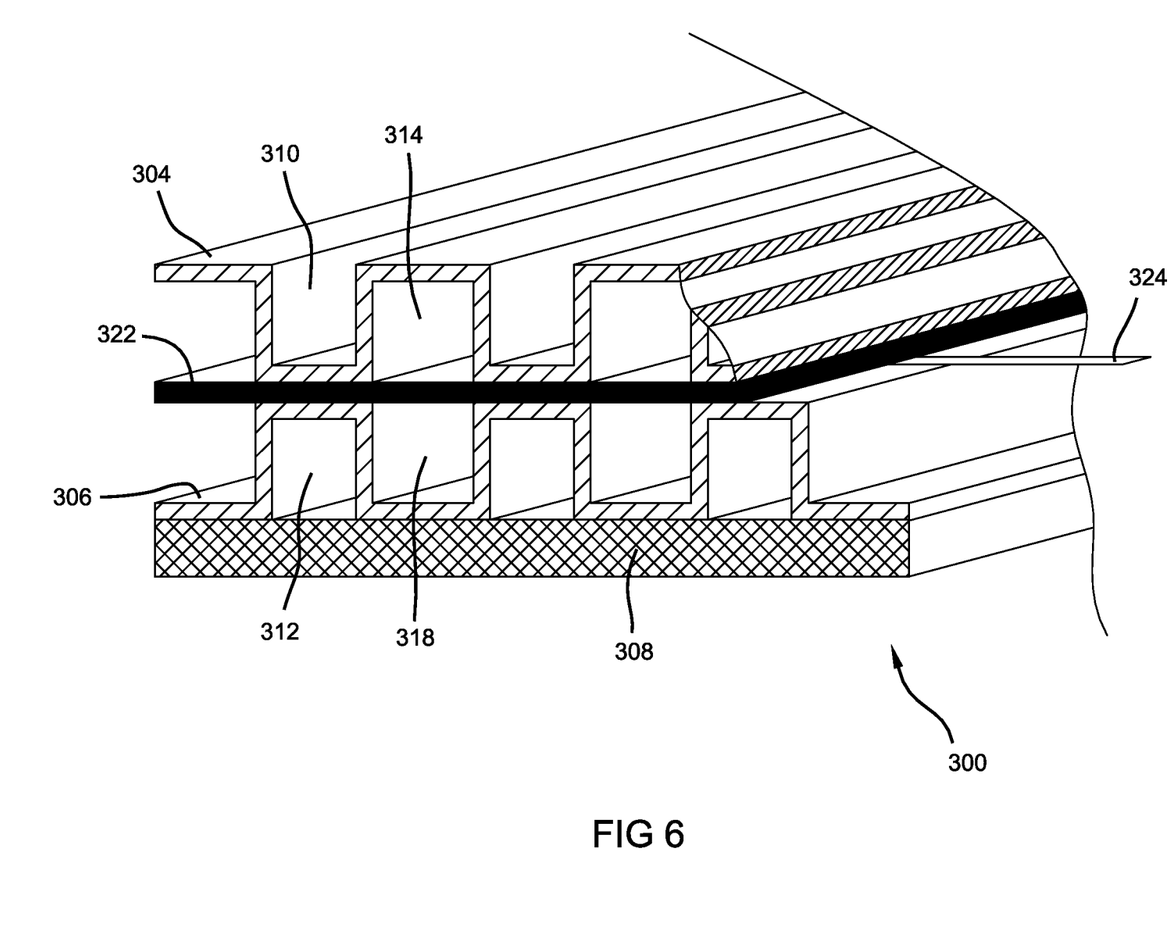
FIG. 6 is a partial isometric view of FIG. 5B illustrating a support member according to the third preferred embodiment of the present invention.

Depending on the material used, the water transport media 322 may require additional structural support to maintain the integrity of the bipolar plate 302. FIG. 6 illustrates one embodiment using one or more support members 324 disposed adjacent the water transport media 322. Preferably, the support members 324 extend in a direction perpendicular to the channels 310, 312, 314, 318 and continue across the entire width of the fuel cell stack 300.

A further aspect of the present invention discloses a method for cooling an electrochemical fuel cell. With renewed reference to FIG. 4, the method includes introducing an oxidant stream to a plurality of cathode reactant channels 212 adjacent a cathode 211, and a fuel stream to a plurality of anode reactant channels 210 adjacent an anode 209. An electrochemical reaction occurs at the MEA 208 wherein a fuel reactant is oxidized with an oxidant reactant producing water, electricity and thermal energy. The MEA 208 is subsequently cooled by transferring heat from the assembly to at least one of the reactants flowing through a first flow path in thermal communication with the MEA 208, thereby heating the reactant. This heated reactant is then directed to a second flow path leading to the MEA 208 in a reactant capacity. A preferred embodiment of the present invention uses the oxidant as the heat transfer reactant. Preferably, the oxidant is humidified as it cools the MEA. The humidification process further cools the fuel cell by using thermal energy as the latent heat of vaporization necessary to vaporize liquid water. The method may also include a second coolant which is transported through a plurality of coolant flow channels in thermal communication with the MEA providing an additional degree of heat extraction and cooling of the fuel cell stack.

FIG. 1 shows the fuel cell power system 10 with instrumentation and control for balancing water flow to hydrate the fuel cell. A real-time control computer 38 is symbolically indicated as an element with signal line interfaces (providing signal or data communication with said real-time control computer) to a differential pressure transmitter 42, hydration measurement 43, control valve 44, flow measurement 45, and combustor emissions measurement 46.

Differential pressure transmitter 42 is shown in a single instance in system 10, representing at least one such transmitter 42 for a fuel cell stack 22; in alternative embodiments, a larger number of instances of differential pressure transmitter 42 are deployed for measuring fluid flow pressure drop between the inlet and outlet of the air feed coolant channels.

In an embodiment using a membrane in a fuel cell with bipolar plates, the flow rate of water 47 to the membrane is further controlled in one embodiment responsive to a measurement signal from differential pressure transmitter 42 by use of control computer 38, control valve 44, and flow measurement 45. In an embodiment using a nebulized water feed to air stream 24 in a fuel cell with bipolar plate, the flow rate of water 47 to the nebulizing system (e.g., spray nozzles—not shown, but which should be apparent) is further controlled in one embodiment responsive to a measurement signal from differential pressure transmitter 42 by use of control computer 38, control valve 44, and flow measurement 45.

Further in a consideration of a fully balanced fuel cell system, even as the above description has focused on the humidification of air feed streams to the cathodes of MEAs, it should be apparent from the above discussion that fuel streams delivered to anode reactant (fuel reactant) channels are, in some embodiments, substituted for a portion of the set of air feed stream humidification channels so that humidification/moisturization along with appropriate cooling of the fuel reactant stream to the fuel cell is also appropriately achieved.

As should also be apparent to one skilled in the art, an oxygen gas stream having about 25 weight percent oxygen or greater may, in some embodiments, be fed or provided to the oxidant coolant channels in the place of air.

It should be appreciated that while the present invention discloses the use of two-plate member bipolar plates, the concept of unitized bipolar plates, or bipolar plates manufactured from a single piece of material are also suitable for use herein. Unitized bipolar plates may be formed by the extrusion of a conductive material as is known in the art. The use of a unitized bipolar plate would simplify the fuel cell manufacturing process by eliminating the need to pattern, shape, align and electrically bond two plate members together. Additionally, a variety of combinations or configurations alternating the liquid coolant channels and oxidant coolant channels in the fuel cell assemblies is feasible and contemplated within the scope of the present invention.

Thus, the description of the invention is merely exemplary in nature and variations that do not depart from the gist of the invention are intended to be within the scope of the invention. Such variations are not to be regarded as a departure from the spirit and scope of the invention.

What is claimed is:
1. A fuel cell assembly comprising:
an electrode;
a plurality of cathode reactant flow channels distributing an oxygen containing reactant to said electrode and a plurality of anode reactant flow channels distributing an anode gas to said electrode;
a first set of coolant flow channels receiving said oxygen containing reactant upstream of said reactant flow channels and directing said oxygen containing reactant to said reactant flow channels; and a second set of coolant flow channels separate from said first set, in heat transfer relationship with said electrode, and containing a liquid coolant,
   wherein said liquid coolant and said oxygen containing reactant are different,
   wherein said electrode forms a part of an MEA and said first set of coolant channels are disposed directly between only the cathode reactant flow channels and said second set of coolant channels are disposed directly between only the anode reactant flow channels.

2. The assembly of claim 1, wherein at least one channel of said reactant flow channels is surrounded on three sides by said coolant flow channels.

3. The assembly of claim 2, wherein two sides of said reactant flow channel face respective channels of said first set.

4. The assembly of claim 1, wherein at least one said reactant channel has a height of about one-half the height of an adjacent said coolant channel of said first set.

\* \* \* \* \*